INVENTOR
CHARLES C. VOGT
JAMES W. MARTIN
HAROLD A. BARBER
BY
ATTORNEYS

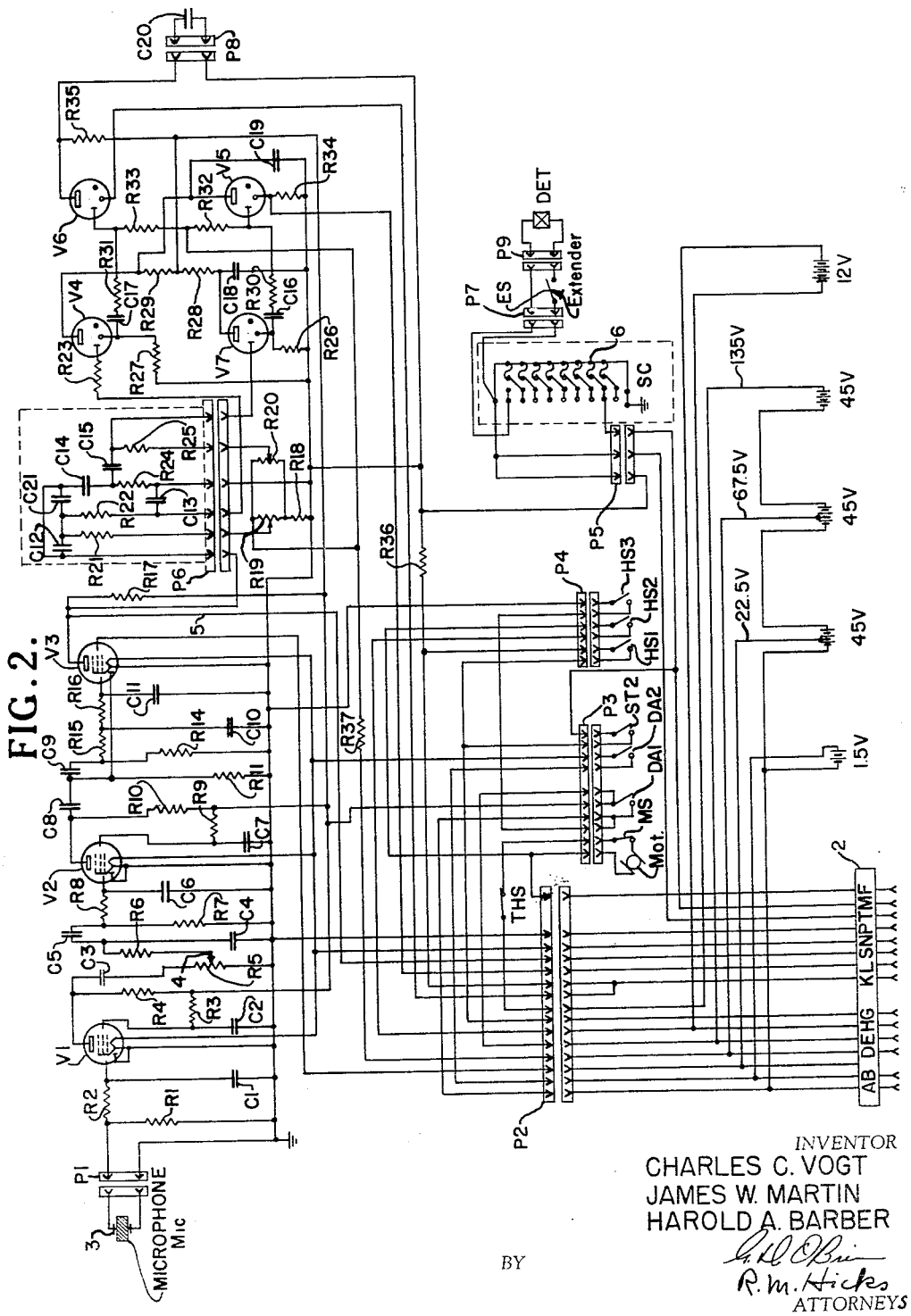

2,956,226

MINE TEST SET

Charles C. Vogt, Bethesda, and James W. Martin and Harold A. Barber, Silver Spring, Md., assignors to the United States of America as represented by the Secretary of the Navy Filed Dec. 23, 1952, Ser. No. 327,704

1 Claim. (Cl. 324—73)

(Granted under Title 35, U.S. Code (1952), sec. 266)

The invention described herein may be manufactured and used by or for the Government of the United States of America for governmental purposes without the payment of any royalties thereon or therefor.

This invention relates to a mine electrical system, and a mine test set therefor. More particularly it relates to the novel adaptation of a mine circuit for the incorporation therein of a test plug adapted for reception of a mating plug of the test set whereby the operational condition of all the electrical component circuits which are subject to change with assembly or to inadvertent switch actuation with mine handling may be tested by the test set after the insertion of the mating test plug into the plug receptacle of the mine. The tests of the mine circuit are thereafter accomplished by the test set by action of the operator in merely rotating a multi-position switch of the test set through the sequence of test positions and observing the indications of the test set thereof. In the last and most comprehensive test of the sequence, the operator simulates an input signal to the mine transducer, thereby providing activation for an overall operative check on the mine amplifier and control circuits.

In prior art mines of the type with which the instant invention is concerned, the mine as assembled generally includes a number of preassembled or fabricated subassemblies. The utilization of the subassemblies in mine apparatus, the general nature of which apparatus does not readily lend to accessibility of components after incorporation in the unitary assembly, is such that certain of the subassemblies are not likely to be affected by rough handling encountered after assembly and prior to usage, are stable and therefore are advantageously adapted for pretesting.

Other devices and circuit components, the mine assembly relationships of which have heretofore necessitated that if testing is required, it be done before insertion in the mine since accessibility thereto is limited after assembly, by way of example, the battery assembly, the hydrostatic switch unit, the ship sequence selection apparatus, and the mine arming motor and switch assembly associated therewith are subject to performance changes subsequent to completion of the mine. While preassembly tests of these components provide a means of ascertaining their initial operability, it is frequently difficult if not impossible to make a test thereof after the connector unit which physically associates these subassemblies with the mine system has been connected into the mine circuit. Moreover in prior naval mines there has been no way in which the mine as a complete assembly could be tested. This tended to render it difficult to ascertain whether the proper electrical contact of all plug connections had been properly made mechanically, and that all switches were in the desired condition for service use thereof.

The instant invention overcomes these disadvantages by the provision of a test receptacle on the mine, which receptacle is located preferably in the extender well whereby a mating plug of a test set may be connected thereto. A series of tests may then be made on the separate switches of the mine circuit as well as tests to determine the operating condition of the microphone, mine amplifier and detonator circuits associated therewith.

A typical mine of generally conventional type adapted for inclusion of the test plug in the circuits thereof includes a microphone adapted for reception of ship propeller noise or hull vibrations transmitted through the water thereto and means for the amplifying and filtering of said signal to pass the frequency selected. It may include in the output of the amplification stages thereof, thyratron circuit arrangements for preventing mine firing in the event that the characteristic of the signal received is of greater or less amplitude rate of change than that for which the mine is preselected and in which the circuits condition the mine for subsequent activation by a second signal.

The mine may additionally include a delayed arming motor and mechanism associated therewith which additionally provides for mine sterilization after a predetermined time lapse, and a hydrostatic switch arrangement adapted to render the mine active upon launching to a predetermined depth in a body of water.

An additional feature or arrangement incorporated in the mine circuit herein described and included for purposes of illustration provides for selecting the ship of a series of ships passing thereover as for example one of a convoy which it is desired to destroy. This function is provided by a pulse sensitive selective fuze switch assembly and circuit arrangement incorporated therewith, in which a pulse or a series of pulses derived from the thyratron circuit successively severs one of a series of sequentially related fuze elements until the predetermined number of pulses, corresponding to the relationship of the desired ship of the convoy is received. Thereupon mine firing takes place.

The test set of the instant invention which is adapted for plug-in connection with the mating plug of the mine circuit incorporates a multiple switch, a milliammeter; and an amplifying circuit for one of a pair of gas or thyratron discharge tubes. The switching arrangement of the test set is such that a first position thereof the filament supply of the mine for the tubes of the amplifier is carried through the parallel connected filaments in series relation with the meter to complete a circuit whereby the condition of the hydrostat switch may be ascertained, since it functions in service upon closure thereof to provide the ground return. In the test condition the test set switches complete this portion of the circuit. The test set switch at the next sequential position thereof, functions to indicate the current flow through the amplifier tube filaments and thereby indicates the condition of the respective ones thereof as well as shows continuity of the filament circuit.

The third of the multi-positions of the switch provides an indication as to whether the second of the hydrostatic switches is open, and additionally verifies that the plug connection for the motor switch is properly made, that the motor switch is closed and also that the thermostat switch is closed. With respect to this test position it is noted that no test is made if the ambient temperature is outside the predetermined limit corresponding to the preselected range of the thermostat, since in this condition the thermostat switch is open.

In the fourth switch position, a continuity check is made by connecting the high voltage battery circuit, which is in parallel with a circuit to the terminals of a sterile switch, through the test circuit, thereby ascertaining the open circuit condition of the sterile switch by current flow indications in the test meter. In the event the switch is closed the circuit relationship in the mine is one producing a direct short circuit across the mine batteries thereby sterilizing the mine, and thus providing no indication on the test set meter.

When the switch selector knob is subsequently advanced to the fifth switch position, a battery circuit with one terminal at ground potential through the test set is connected in series with the meter circuit at the high potential side thereof and thence to the ship selector fuze block of the mine, which when properly connected through suitable plug-in connections thereof completes the circuit to ground in a manner indicating by the extent of meter deflection, the continuity thereof, and that a proper physical and electrical connection exists between this sub-assembly and the balance of the mine circuit. This test additionally functions to indicate the existence of high resistance connections through the circuit connectors.

A further test on the ship selector fuze block is accomplished at the sixth position of the test apparatus in a manner whereby the continuity of the mine circuit through a first fuze of the fuze block is ascertained. This test circuit differs from that of the previous position in that the circuit which is completed to ground provides for current flow through a second connection plug terminal, thence through the fuze element to complete the circuit to ground.

The seventh position of the sequential tests as provided for in the hereinafter described preferred embodiment of the invention provides for open circuit switch condition verification for an additional hydrostat switch, not previously checked, and a second of the motor controlled switches. The hereinbefore named first and second sterile switches are also part of a group which are operatively associated by ganged coupling arrangements with the motor drive unit hereinafter described in greater detail.

It is worthy of note that the test unit requires no internal battery excitation nor does it require the use of battery power from an external source; the power supply source therefore being derived from that of the battery assembly of the mine. The amplifier stage incorporated therein is adapted to tap the output of the mine amplifier as applied to the thyratron tubes of the mine and impose the output of the signal amplifier through the external amplifier of the test set to provide for discharge of one of the thyratrons of the test set if certain test conditions are met thereby. The specific details of this circuit and operative relationships thereof with the circuitry of the mine is hereinafter set forth in greater detail.

It is a feature of this invention to provide a mine circuit with a plug connector arrangement adapted for reception of a mating plug and connected to a test set capable of providing complete test of the mine electrical circuit.

It is one object of this invention to provide means of testing a mine circuit after assembly thereof by the use of only a single piece of test apparatus.

Another object of this invention is to provide a test set for a mine which is capable of providing a complete test of a mine circuit by selectively closing switch control circuits thereof and which test set requires no external or internal power supply other than that of the mine and simultaneously indicates the conditions of the batteries thereof with switch conditions checking.

It is a further object of this invention to provide a mine circuit test set by means of which a complete series of tests on the mine circuit may be made by the mere sequential change of a ganged switch device to sequentially test the mine circuits in a predetermined order whereby at the end of said switching operation a complete test of the mine circuit is accomplished thereby.

It is a further object of the invention to provide a mine test set for a mine circuit in which the output energy of the amplification stages may be derived from a microphone signal source to provide an overall response indicative of signal-characteristic selectivity of the mine circuit.

Other objects and many of the attendant advantages of this invention will be readily appreciated as the same becomes better understood by reference to the following detailed description when considered in connection with the accompanying drawings wherein:

Fig. 2 is a schematic illustration of a mine circuit having circuit provisions therein for testing by the unit of Fig. 1.

Figure 1:
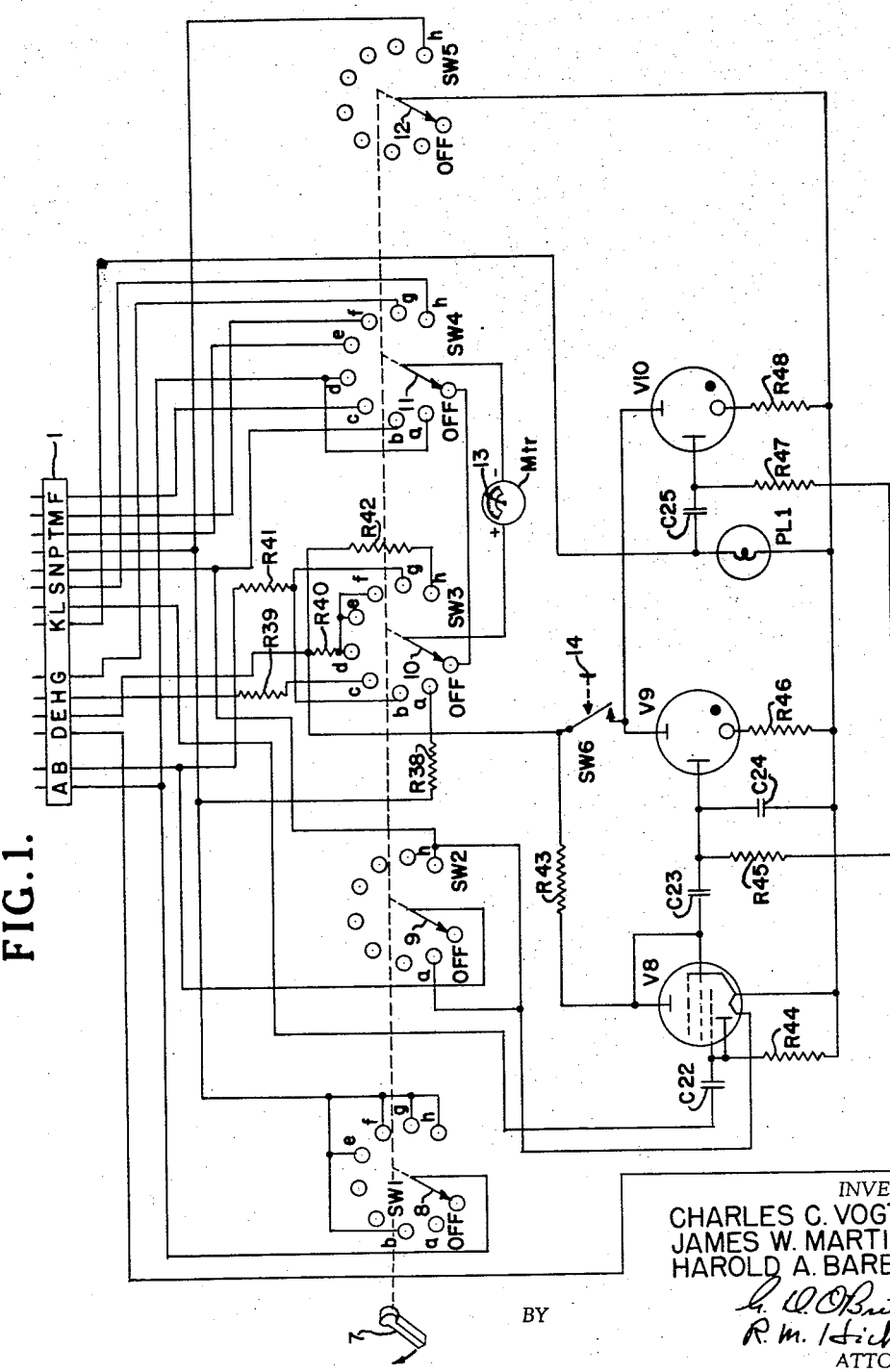
Fig. 1 is a schematic diagram of the mine test set circuit.

Referring now to Fig. 1 of the drawings, there is shown in schematic form a test set circuit of a character adapted to test a mine circuit of the character illustrated schematically in Fig. 2. The test circuit as herein described is for use with the particular mine circuit shown, although slight modification of other mine circuits to provide circuit take-offs to a plug-in type connector as represented at 1 for the male plug member and 2 for the female receptacle of Fig. 2 will permit versatility of use for the test unit.

The terminals of the corresponding plug and receptacle terminals are indicated by alphabetical references characters with the same character for both the male and female elements thereof.

The particular circuit relationships of the test set as hereinafter described in greater detail will be more clearly understood when the same is considered in light of the following descriptive matter pertaining to the mine circuit. It is to be understood that while the mine circuit is of a generally conventional nature and as such is not a part of this invention, certain modifications thereof as hereinafter included in this description do constitute a part of this invention and render the circuit and a mine incorporating this circuit particularly adaptable for test by the disclosed test circuit.

It is readily apparent that the invention is not limited in its practical applications, to the particular circuits shown.

The mine circuit shown schematically in Fig. 2 of the drawings, while illustrative of the mine circuit with which the instant test set is well adapted for usage, is not intended to be limiting with respect to the number or nature of components thereof since the mine circuit and other underwater ordnance circuits when modified in view of this teaching may be tested advantageously by test apparatus of the character herein described. However, the description hereinafter presented will facilitate a better understanding of the purpose, function and interrelationship of the test set to the mine circuitry.

Throughout the balance of this description and for both the mine and test set, the prefixes R and C refers respectively to resistors and condensers while M*ot* refers to a motor, M*tr* to a meter, SC to a ship counter, and M*ic* to a microphone. The prefix designation V refers to vacuum tubes except where specifically referred to as gas discharge tubes, while prefix P is indicative of the several plug-in connectors shown in Fig. 1. Other reference character designations will be apparent as the description proceeds.

The mine circuit comprises a microphone M*ic* at 3 by which certain signals such for example as sound energy presented from an underwater acoustic field set up by the passage of a ship within the vicinity thereto, will be converted into an electric signal by piezoelectric action on the crystal microphone, passed through connection plug P1, developed as a signal voltage across R1, and fed through a frequency filter circuit comprising resistance R2 and condenser C1 to the grid of the first stage vacuum tube amplifier V1. The output of the first amplification stage appearing at the plate of tube V1 and across load resistor R4 is filtered by the band pass filter stage comprising C3, R5 and R6. The first stage amplifier is operated as a conventional pentode connected resistance coupled A.C. amplifier with the hereinbefore mentioned band pass filter at the input thereto. The D.C. screen voltage is applied from a positive battery source hereinafter set forth in greater detail through dropping resistor R3, with any A.C. appearing therein by-passed by condenser C2. The band pass filter characteristics of the input filter are such as to peak at approximately 30 cycles per second. The values for the grid resistance R1 and plate load resistor R4 are chosen in a manner such that in the static state the plate voltage is at approximately the middle of the linear range of the tube characteristics, whereby the tube operates as a class A voltage amplifier.

The coupling of the A.C. output of the first stage, as coupled through D.C. blocking condenser C3 to the input of the following stage, by the three section band pass filter comprising resistive and capacitive components R6, C4, R7, R8, C6 further includes the variable resistor or potentiometer R5 which is tapped by a movable element 4, and functions as a gain control for the circuitry. The second stage amplifier tube V2 is also a pentode voltage amplifier operating class A to provide additional signal gain. It utilizes R10 as a plate load resistor and R9 as a screen dropping resistor similarly as in the circuit of tube V1. Condenser C7 for tube V2 corresponds in function to C2. The signal is thereafter passed to tube V3 which is a dual purpose tube providing the combination of a diode rectifier and a pentode connected D.C. amplifier stage.

The tube V3 shown in the drawings is of the same type as used in the previous amplification stages; however the respective diode plates are not utilized in the first and second stages and are therefore tied to the grounded side of the tube filament. It is to be understood that other types of tubes may be used for these proceeding amplifying stages. In tube V3 the diode plate is connected to ground through resistance R11 in a manner whereby the received signal as amplified and appearing as an output at the plate of V2 is coupled to the diode plate of V3 through coupling condenser C8. The D.C. voltage developed across the diode plate and filament of V3 which functions as the heater cathode is applied across R11. This diode operates as a half-wave rectifier and provides a conducting relationship to the cathode on the positive half-cycle to pass only the negative half-cycle of the signal to the control grid of tube V3. The relationship is such that the average voltage applied through the two section filter R15, C10 and R16, C11 to the grid of the tube V3 is caused to become increasingly negative with respect to ground as the target ship approaches the mine.

Since in service use in a mine, there exists a comparatively constant background signal, a background eliminator condenser C9 is provided in the input to the control grid of tube V3 and functions in a manner whereby the constant signal rectified by the diode portion of the tube V3 will not pass to the grid thereof. The resistor R14 provides a discharge path for condenser C9 so that a heavy charge built up on the condenser by a ship's signal or a countermining signal will bleed off.

The amplifier plate voltage of V3 increases as the negative grid voltage, caused by the rectified ship or countermining signal, builds up. The relationship of this amplifier section of tube V3 is such that in the quiescent state thereof it conducts sufficiently to reduce the plate voltage to approximately 5 volts. However, when an increasingly negative voltage is applied to the grid, the plate current decreases, with a rise in plate voltage from its static value of approximately 5 volts to a high of about 125 volts. The tube is operated near saturation in a manner whereby a change created when negative bias is applied to the grid provides a positive change on the plate load resistor thereof. The output of this tube is provided with a tap conductor 5 to which terminal S of test receptacle 2 is connected for reception of the corresponding terminal of test plug 1 in the manner shown and for a purpose hereinafter set forth in greater detail.

The output of this tube also flows through a rate circuit which in essence comprises a set of two rate of change circuits assembled together into an interchangeable plug-in unit as shown in dotted outline on Fig. 2, for insertion in the mine circuit by plug connections at P6 with a separate filter circuit respectively for the firing channel and the protective or anticountermining channel.

The time constant of the firing channel is chosen as for example at 38 seconds while the protective channel time constant is selected at approximately 2.5 seconds. However, if a longer time constant is desired, an alternate plug-in unit may be inserted in the mine circuit at P6 with component values differing for the 2.5 seconds delay, while the longer time rate circuit remains substantially the same. It has been found satisfactory to interchange the 2.5 second plug with a 6 second plug to meet most service requirements.

The circuit discriminates between a signal resulting from a ship, and a short duration signal or one having a slower rate of change in amplitude characteristics.

The plate potential of the tube V3 as applied to the rate circuit is thereafter applied to the grid or control anode circuit of the gas filled discharge tubes V4 and V7. The function of the rate circuits as interposed between the output of amplifier V3 and the input of V7 is such that if a signal possessing a very slow rate of amplitude increase is received, the R-C circuitry provides a relationship wherein the condensers of the rate circuit are permitted to bleed off before an actuating charge can be built up for either the protective or firing channel. A signal which rises rapidly in amplitude is fed to the protecting channel, which is a channel parallel to the firing channel but with different circuit characteristics. The rapid amplitude increases cause tubes V7 and V5 to fire. As V5 fires, the condenser C19 which is common to both V4 and V5 in the plate circuits thereof, discharges and removes plate current from V4, thereby deadening the firing channel. A preferred dead period will be approximately 25 seconds after each actuation of the firing circuit. This is the time required for the firing condenser and plate condenser of tube V4 to charge.

The resistor R23 functions as a current limiting resistor in the grid circuit of tube V4.

The R-C filter circuits which are interposed between the plate of V3 and the grids of V4 or V7 are arranged to pass slow rate of gain signals to the plate of V4 and high rate of change signals to the grid of V7. This relationship is apparent when consideration of the circuit is taken, by way of the example, wherein a signal envelope with a slow rate of gain such for example as that produced by a ship traveling at a speed of approximately 4 knots at a distance of 24 feet with respect to the mine appears as a signal on the plate of the last amplifier tube V3, the parallel condensers C12 and C21 of the R-C circuit which additionally comprises resistors R21, R19, R18, and a second R-C filter stage R22 and C13 permits the build up of a potential through resistance R23 on the grid or control anode of gas discharge tube V4 sufficient to fire the tube.

Also the same signal appearing at the plate of V3 is applied to the R-C circuits comprising condenser C14 resistor R24 as a first stage and followed by second stage capacitance C15 and resistance R25, a portion of resistor R20, through resistance R18 to ground, to supply the signal to the control anode of V7 in the event the time constant is sufficient to build up to a firing potential thereon. However, in the set of conditions for passage of a signal to gas discharge tube V4 for a ship traveling as for example at 4 knots, the time constant is small and therefore insufficient to build up a firing potential at the control grid of gas discharge tube V7. In this case the charge will bleed off the condensers before the required value for a firing potential can be reached.

Assuming a second set of conditions for a comparatively rapid rate of gain such as produced by an explosion in proximity to the mine, as the amplified signal appears on the plate of amplifier tube V3, the R-C circuits in both the firing and protective channels build up. The firing of the mine is prevented, however, by the function of the anticountermining circuit's gas discharge tube stages which comprise the protective channel. The smaller time constants of this protective rate-circuit allow a firing potential for the tube V7 to be built up on the grid thereof prior to the build up of a firing potential on the grid of the discharge tube V4. As tube V7 fires, the condenser C18 discharges from plate to cathode of the tube and produces a potential across the resistor R26 between cathode and ground.

The potential appearing across resistor R26 is applied through condenser C16 and limiting resistor R30 to the grid of an additional gas discharge tube V5 producing firing thereof. With this firing the charge appearing on condenser C19 is discharged through the tube V5. Since this condenser C19 is common to the plate circuits of tubes V4 and V5 the discharge thereof prevents firing of either tube during the greater portion of the recharging period of this condenser during the next cycle. The tube V5 will arc due to the very small value of resistance of approximately two ohms which is incorporated in the cathode circuit of this tube at R34.

As discharge tube V5 is extinguished, condenser C19 in the plate circuit thereof is recharged through resistor R29 which is in the plate or B+ circuit. During the charging time for condenser C19 the potential drop created by current flow through resistor R29 reduces the plate potential of both of the discharge tubes V5 and V4 to a value below the conduction point. It is thus apparent that neither V5 nor V4 can fire during the greater part of the charging cycle of C19 which in practice is preferably 25 seconds.

As a slow signal fires discharge tube V4 the condenser C19 discharges through the tube thereby developing a potential across resistor R27. The potential appearing across resistor R27 is applied to the grid of discharge tube V6 through condenser C17 and limiting resistor R31. With the application of this signal the condenser C20, which is a firing condenser in the firing circuit, is discharged through the gas discharge tube V6 and applied to one of the first fuze element of the ship counter SC at 6. A current limiting resistor R36 of approximately three ohms, is connected in parallel with the ship counter to prevent more than one ship count for each discharge actuation of the firing condenser C20. This resistor functions to discharge condenser C20 to the point where it no longer contains sufficient energy to sever the next subsequent fuze of the ship counter. While the ship counter shown is of the character shown and more fully described in the copending application to W. D. Mounce S.N. 151,028, filed March 21, 1950, now Patent No. 2,779,014; other suitable equivalents may be incorporated into the circuit in lieu thereof.

A constant biasing potential is applied through dropping resistor R27 and a portion of resistors R19, R21, R22 and R23 into the grid of discharge tube V7 and from the same source through a portion of R20, and R25 to the control anode of tube V7. The potentiometer R19 is adjusted in a manner whereby a grid bias of approximately 50 volts is applied to V4, while the potentiometer R20 for tube V7 is adjusted to a value slightly higher than that of V4 to provide a grid bias of approximately 55 volts. The exact bias chosen for these tubes will depend upon the firing voltage of the individual tubes and is set during sensitivity adjustments of the mine circuit.

A fixed bias for tubes V5 and V6 is applied from the 67.5 volt battery source hereinafter set forth in greater detail through dropping resistor R37 to the junction of resistors R32 and R33 respectively for the grids of the gas tubes V5 and V6.

The sources of D.C. power for the mine circuit are derived from a group of batteries comprising a 1.5 volt filament supply, a 135 volt battery pack with taps at 22.5 volts, and 67.5 volts, and a 12 volt battery supply for operation of the arming motor Mot. The plug connector P2 connects the batteries and the test receptacle 2 into the mine circuit. The 12 volt supply to the motor Mot is through the hydrostat switch HS2, and is returned through the motor switch MS, and the thermostat switch THS.

The plug connection P3 of Fig. 2 provides for connection of the delayed arming switch terminal units of DA1, the motor Mot, motor switch MS, and the sterile switch ST2, as indicated at P3, which may be connected into the mine circuit. The switches of this plug assembly are operated by the motor Mot in time delay relationship after the launching of the mine.

The hydrostat switches are connected into the mine circuit by connector P4 in an obvious manner.

Connection P5 inserts the ship counter SC across the output of the firing circuit, while the extender switch ES is connected across the output of the stepping fuze block SC by connection P7. Plug-in connection P9 places the detonator or squib indicated at DET on Fig. 2, across the ship counter and in series with the extender switch.

Referring again to Fig. 1 of the drawings, there is shown a mine test set circuit of a preferred embodiment of the invention which incorporates the aforementioned male plug 1, for intercircuit connection with the correspondingly referenced terminals of the female plug 2 of the mine circuit of Fig. 2. The terminals of the plug 1 are connected respectively as illustrated to one or more of five ganged switches indicated SW1 to SW5 respectively. Each of these mutually ganged switches comprise eight make positions and an off position, with terminals at one or more of these positions and designated *a*, *b*, *c*, *d*, *e*, *f*, *g* and *h* respectively whereby one to five switch circuit relationships are provided. The entire circuit is in ganged association at each station thereof, by the common ganging selector 7, and the movable contacts 8 to 12 respectively for switches SW1 to SW5.

The test circuit additionally includes a calibrated meter Mtr with indications at 13 and having the positive terminal thereof connected to movable contact 10. The negative terminal side of the meter is connected to switch arm 11 substantially as illustrated.

The meter Mtr functions as an ohmmeter and the circuitry through the terminals of switch arm or contact 10 of switch SW3 serve to present the several resistors R38, R39, R40, R41 and R46 of differing value and selectively associated therewith, individually in series with the positive terminal of the meter at each of the contact terminals thereof. The circuit of the test set additionally comprises a signal amplification stage and associated visual indicating elements, the purpose and manner of operation of which is hereinafter set forth in greater detail.

The circuitry of Fig. 1 additionally includes the triode connected vacuum tube V8, which is a combination diode-pentode of a variety similar to that used in the mine amplifier. Also included are the gas discharge tubes V9 and V10 which are similar to tubes V4 to V7 of the mine circuit. The circuit additionally includes a reset switch SW6 having an operator at 14, and condensers C22, C23, C24 and C25 in the circuitry of these tubes, the function of which will become more apparent as the description proceeds. The resistors incorporated in the individual circuitry of the several tubes of the test set comprise resistor R43, R44, R45, R46, R47 and R48. Also a low voltage pilot light type indicating lamp PL1 is included in the test set gas tube circuitry and connected across the input of tube V10.

The inter-related function and mode of operation of the tube circuitry of the test set will be apparent if it be assumed that the gang switch members are rotated through the test positions 1 to 7 to present the ohmmeter in circuit relationship with the mine in a manner as hereinbefore set forth and utilizing the battery supply of the mine, for test purpose which will become apparent as the description proceeds.

Let it be assumed for purposes of description that the switch is advanced through positions $a$ to $g$ in sequence to provide the hereinbefore set forth circuit relationships, and thereafter moved to the eighth terminal $h$ illustrated. In this condition a circuit from the battery filament supply is completed through connection A of the connector plug 1 to the movable contact 8 of switch SW1 at the eighth position $h$ thereof and returned to ground in the mine through the terminal P of the female connector 2. The negative side of the battery of the mine is brought to terminal B of the test set. At terminal B of connector 1 the circuit follows through contact $h$ thereof by terminal N of female connection 2 and is grounded within the mine. The test circuit at this position additionally comprises a filament loop from terminal point P of connector 1 to the fixed contact $h$ of switch SW5 through the movable member 12 thereof and across the filament of tube V8 to terminal $h$ of SW2. The cathode of tube V5 of the mine is brought out terminal L of the mine and test plug to the coupling condenser C22 at the grid of V8, while the 135 volt B+ supply derived from the mine and connected to terminal E of the test plug is presented to the main anodes of gas discharge tubes V9 and V10 through the normally closed contacts of reset switch SW6. Additionally, the terminal K of the test plug connection presents the output at the cathode of gas discharge tube V6 of the mine to the condenser C25 for coupling to the starter anode or grid of V10. The connection is made to condenser C25 at a junction with one side of the indicator lamp PL1.

Any initial voltage existing with conduction across either of the gas discharge tubes V9 or V10 will be indicated by illumination of one or both of these tubes. The lighted tube or tubes are thereafter extinguished by momentarily opening the reset switch SW6 to interrupt the anode supply thereto.

The signal output of amplifier tube V3 is applied through terminal point S to terminal $h$ of switch SW4 for connection through 11 to the meter M $tr$ negative terminal. The positive side of the meter is connected through 10 to terminal $h$ of SW3 which presents resistor R42 in series therewith and is further tied to a junction of the 135 volt B+ supply at terminal E.

The several individual circuit relationships occurring with the positioning of the switch selector 7 selectively in positions $a$ through $g$ thereof as hereinbefore set forth provide test relationships the function of which will become more apparent as the description proceeds, and particularly as described in the portion dealing with the operation of the device.

Proceeding with the assumed positioning of the switch selector at the eighth position $h$ of the gang unit, a signal from the cathode of tube V5 is presented through coupling condenser C22 simultaneously to the diode plate of this tube and to the control grid of the amplifier section thereof. The diode section of this tube conducts on the positive half-cycles of the signal and provides control over the tube only with the passing of the negative half-cycle thereof. The output of this tube V8 as developed across resistance R43 is applied through the resistance capacitive coupling circuit of condenser C23 and resistance R45 to the grid or gas triode V9. A predetermined grid bias is applied from the 67.5 volt battery supply of the mine through terminal D of the plug and resistance R45 to this control grid. Any A.C. component appearing at this point is bypassed to ground by condenser C24.

The tube circuitry additionally includes resistance R21 as a load resistance to the diode plate, while the circuit of V9 includes the resistance R46 in the cathode circuit thereof. A 67.5 volt supply from terminal D is also applied through resistance R47 to the control anode or grid of V10 which is rendered conducting by application of a suitable pulse from the cathode of the detonator circuit tube V6 applied through connection point K to coupling condenser C25 for the starter anode of tube V10. This tube V10 additionally incorporates a resistance R48 in the cathode circuit thereof similarly as for the tube V9.

The tube V9 functions as an indication for the anticountermining circuit while the discharge tube V10 functions as an indication of the operability of the detonator circuit. These two tubes are both gas discharge tubes and will provide a glow with conduction therethrough.

In operation of the test set with a mine circuit of the character described, the operations include the connection of the male test set plug 1 to the female receptacle 2 of the mine which is preferably in the extender well of a mine casing not shown. The gang selector switch on the test panel is set respectively to the several positions in a sequential order starting from the first position $a$ thereof, wherein a meter reading in the upper portion of the scale verifies that the hydrostat switch HS3 is open.

When selector 7 is positioned at the second station $b$ for the ganged switches connected thereto and with a reading in a similar portion of the scale, the circuit of the test set verifies that the delayed arming switch DA1 is open. The indication on the meter will be zero if the mine is assembled with these switches closed.

A third position $c$ of the test set selector 7 and the multiple switches provides ohmmeter test circuitry for a continuity reading of a character similar to that for the preceding steps to verify that the plug P3 is properly inserted in the mating receptacle connector of the mine, that the motor or sterile switch MS is closed, that the thermostat switch THS is closed and further that the hydrostat switch HS2 is open. The meter will also indicate zero in this position, if the ambient temperature is outside the preselected limit for the thermostat THS thereof; in this condition no test is made when the selector switch is in this position. The fourth position $d$ thereof verifies that the sterile switch ST2 is open.

When the switch selector is rotated to the fifth position $e$, it provides a verification that the connection receptacle at P5 for the ship counter SC is in the mating connector therefor in the mine circuit proper.

The continuity of the circuit through one fuze of SC is verified in the sixth position $f$ of test set selector 7 which also produces a meter reading in the upper portion of this scale. However, the meter will indicate zero if the fuze unit is set for zero ship count on SC. The seventh of the switch positions of selector 7 at $g$ utilizes the ohmmeter circuitry of the test set to verify that both the DA2 switch and the hydrostat switch HS1 are open. It is noted that if ship counter SC is set for zero ship count, the meter does not indicate whether the DA2 switch is open or closed. The meter in this position verifies only that the hydrostat switch HS1 is open. With the selector switch at the seventh position and the ship counter SC set for zero ship count, the condition of the delayed arming switch DA2 may, however, be determined by disconnecting the plug connector at P7 from the extender and shorting the contacts of the receptacle. If the meter indicates zero, the switch DA2 is then open. If the meter pointer indicates in the upper portion of the scale, the switch DA2 is closed.

The switch is thereafter rotated to the eighth position $h$ of the gang selector 7 and following a waiting period of approximately fifteen minutes, the indicator pointer on the meter shall show an indication on the scale calibration at 13.

The indicator verifies the application of the 135 volt B+ supply to both the mine and test set circuits. If the resulting condition is such that either the anticountermine test indicator tube V9, or the detonator circuit test indicator tube V10, lights with application of B+ to the anodes thereof, the reset switch SW6 is momentarily depressed to disconnect the supply of 135 volt potential thereto. The mine circuit is then tested by using the wood handle of a screwdriver or other suitable implement to simulate a countermining input signal, and which is rapped sharply on the tail cover of the mine on a surface adjacent the microphone MIC, to activate the anticountermine channel of the mine circuit. This signal is amplified in the three stages of amplification and applied from the anticountermine high pass filter circuit through tube V5 to the control grid of tube V6 which causes the anticountermine test indicator tube V9 to light. The reset switch SW6 is then depressed by operator 14 and the test indicator tube V9 goes out and remains out. A wait of approximately two minutes follows while observation is taken on the test panel meter which should provide an indication at 13, indicating a non-conduction condition across V3 and allowing time for a charge to be built upon the anode circuit condenser of the detonator circuit of the mine. The screwdriver handle is then rapped gently on the tail cover of the mine adjacent the microphone to simulate a ship signal and is continued until the indicator hand gradually drops to zero. The indicator thus shows the passing of the signal by the mine amplifier. At this point the detonator energy lamp PL1 and V10 in the test set and in the cathode circuit of the mine detonator test indicator tube V6, shall light momentarily. The reset switch SW6 is again depressed and the detonator test indicator tube V10 shall go out. This completes the test of the mine circuit. However, if the detonator test indicator tube and detonator energy lamps do not fire on the first trial, a second trial is made after approximately two minutes to allow bleed off of the charged condensers of the mine timing circuit. This test, however, is conducted only through one firing of the detonator test indicator tube and detonator energy lamps as repeated tests of the firing circuits may cause damage of the firing tube in the mine. Thereafter the test set is disconnected from the mine and the mine is considered ready for operation.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

In combination, a mine electrical circuit of a character comprising a signal transducer, an amplifying circuit means, a detonating means deriving controlling output from said amplifying means, anti-countermining means selectively deriving an output from said amplifying circuit means, means discriminating between a ship characteristic signal and a countermining signal and selectively applying same to said detonating means or anti-countermining circuit means in response to the character of signal intelligence passed by said amplifier, a power source, and a severable element on said mine providing a plurality of interconnecting circuit relationships with a severable element of a mine test set, a mine circuit test set of a character including means adapted for mating engagement with said severable element of the mine, a plurality of gang switches electrically connected to said connecting means and having a common selector element therefor, a meter in said test set, a plurality of meter circuits connected respectively to selector connections of said gang switches, whereby the switch element selectively provides indications of the operability of the amplifying circuit means, the detonating means, the power supply source, and firing and anticountermining circuit test means whereby the operability respectively of these circuits of the mine is ascertained under simulated operating conditions correlative to the passage of a detected and amplified signal appearing at the output of said amplifier whereby the assembled mine unit may be tested externally of the mine under simulated signal input conditions and thereafter be severed prior to mine launching.

References Cited in the file of this patent
UNITED STATES PATENTS

| | | |
|---|---|---|
| 1,901,185 | Nelson | Mar. 14, 1933 |
| 2,396,914 | Cook | Mar. 19, 1946 |
| 2,400,256 | Place | May 14, 1946 |
| 2,400,257 | Miller | May 14, 1946 |
| 2,400,258 | Place | May 14, 1946 |
| 2,696,605 | Knickerbocker | Dec. 7, 1954 |
| 2,756,409 | Lubkin | July 24, 1956 |